INVENTOR.
J. Van Pool

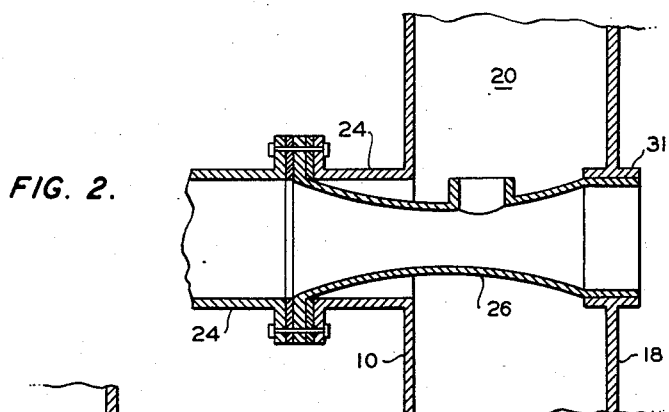
FIG. 2.
FIG. 2A.
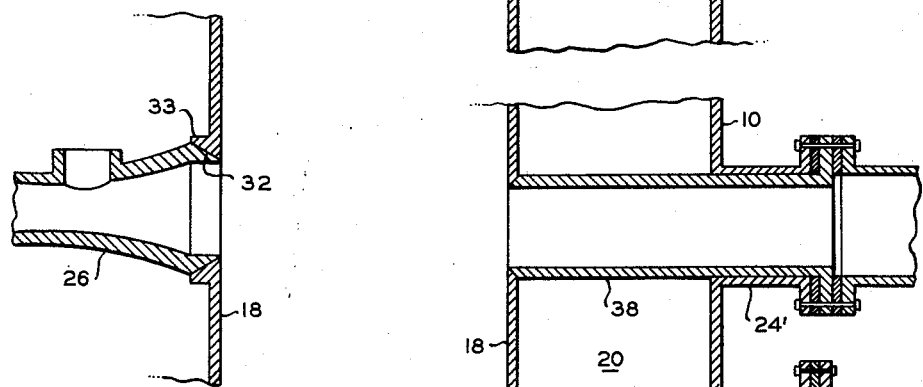
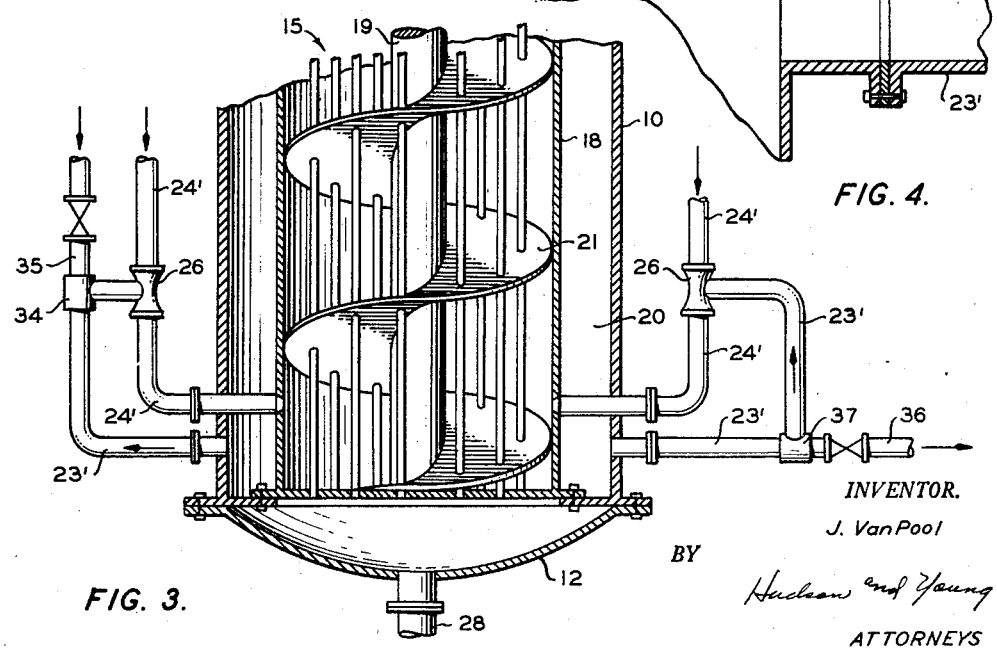
FIG. 3.
FIG. 4.
INVENTOR.
J. Van Pool
BY
Hudson and Young
ATTORNEYS

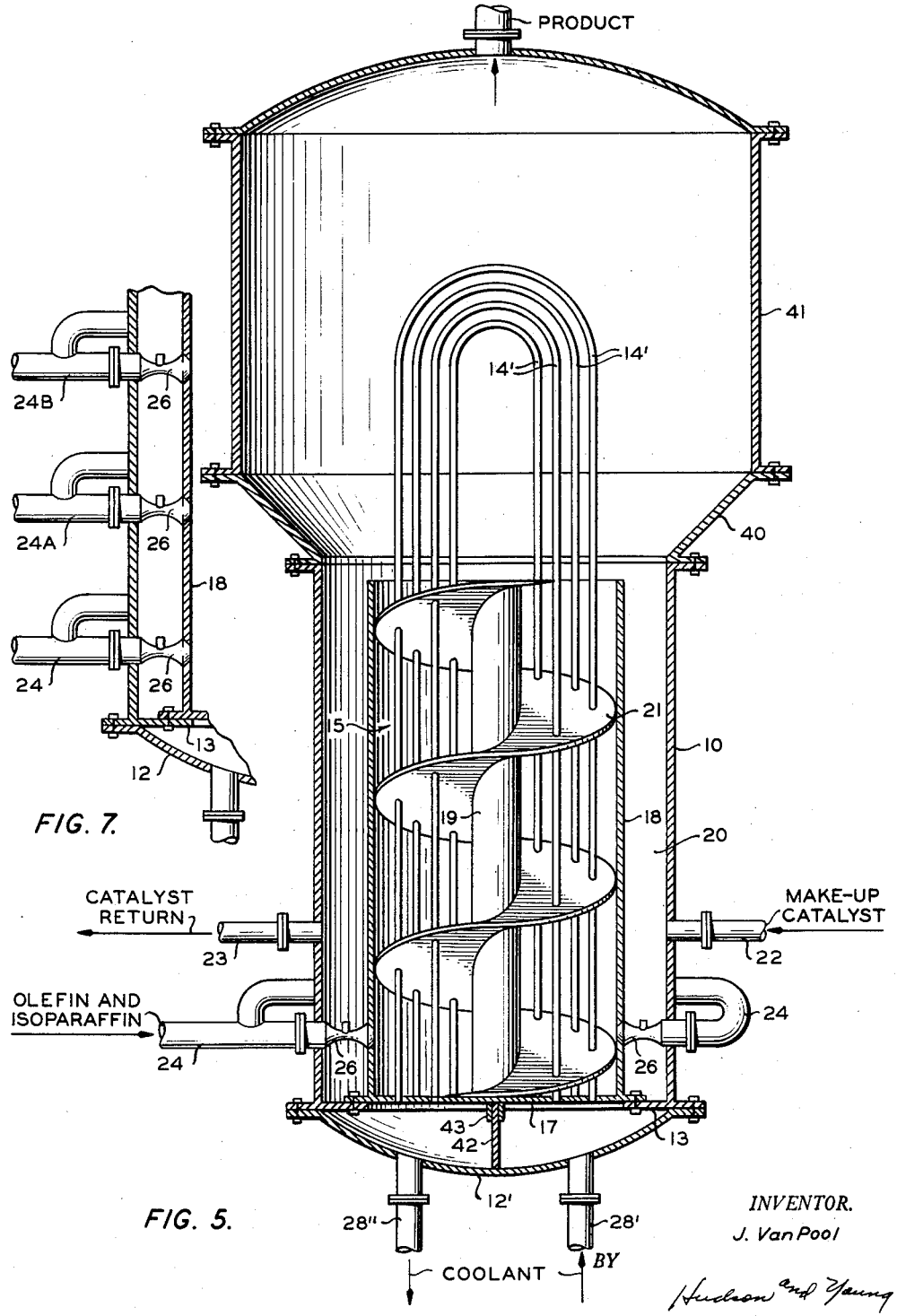

United States Patent Office 2,937,079
Patented May 17, 1960

2,937,079
APPARATUS FOR CONTACTING AND SUBSEQUENTLY SEPARATING IMMISCIBLE LIQUIDS

Joe Van Pool, Bartlesville, Okla., assignor to Phillips Petroleum Company, a corporation of Delaware Application August 6, 1956, Serial No. 602,304

13 Claims. (Cl. 23—285)

This invention relates to a method and to an apparatus for intimately contacting and then separating from each other at least two immiscible fluids. In one aspect this invention relates to an improved method for carrying out an alkylation process. In another aspect this invention relates to an improved contactor-settler for effecting reactions and/or treatment between immiscible liquids.

Many processes and apparatus have been devised for contacting and then separating immiscible liquids. Such processes and apparatus are employed in physical contacting operations, such as the washing of hydrocarbons with various liquid treating agents, and in various chemical reactions wherein hydrocarbons are reacted in the presence of an immiscible liquid catalyst, such as in the alkylation of an isoparaffin with an olefin in the presence of liquid anhydrous hydrofluoric acid. In the methods and apparatus of the prior art the mixing and/or contacting of the immiscible liquids is usually carried out in one vessel and the resulting mixture is passed to a subsequent vessel for separation, as by settling. In carrying out the above described contacting processes, it is frequently desirable to add or remove heat as an aid in separation of the liquid mixture, or to carry out the chemical reaction at a desired temperature.

My invention provides a method and apparatus for causing intimate contact and subsequent separation of at least two immiscible liquids in a single laterally confined, vertically disposed zone having a central lower contacting section, in open communication with an upper settling section, and an annular settling section surrounding said lower contacting section and in open communication with the lower peripheral portion of said upper settling section. Heat exchange means are provided for complete control of temperature by the addition or removal of heat from both said contacting section and said settling section in accordance with the method of the invention.

The invention is particularly advantageous when applied to the alkylation of an isoparaffin with an olefin in the presence of liquid anhydrous hydrofluoric acid. This reaction takes place rapidly with the evolution of considerable heat. I have found when said reaction is carried out according to the methods of prior art that said rapid evolution of heat causes local overheating, particularly at the point where the hydrocarbon stream is introduced into admixture with the acid catalyst. Said local overheating is injurious to the quality of the alkylate produced and in some cases is injurious to the yield of alkylate produced. In reactors of the prior art, I have found that in a reaction zone which nominally operates at a temperature of 100 to 105° F., it frequently happens that temperatures in the order of 120° are attained. My invention, by providing immediate cooling of the mixture of hydrocarbons and acid catalyst, makes it possible to avoid this local overheating. In effect, my invention makes it possible to carry out the said reaction at a lower temperature with the same amount of cooling water and without the expense of refrigeration.

It is known that low temperatures favor the yield and quality of alkylate produced in the HF alkylation of isoparaffins with olefins. I am aware that it has even been proposed to employ refrigeration so as to maintain the reaction zone at abnormally low temperatures. However, refrigeration is expensive and is usually beyond the reach of the small refiner from an economic standpoint. Furthermore, even when refrigeration is employed, the advantages of my invention are still realized as will be discussed further hereinafter.

An object of this invention is to provide an improved apparatus and an improved method for intimately contacting and subsequently separating at least two substantially immiscible fluids. Another object of this invention is to provide an improved apparatus for intimately contacting and subsequently separating at least two substantially immiscible fluids in a single vessel. Another object of this invention is to provide an improved method for intimately contacting and subsequently separating two substantially immiscible liquids in a single vessel. Still another object of this invention is to provide an improved method for the alkylation of hydrocarbons wherein the rapid initial increase in temperature which causes local overheating in the reaction zone is substantially avoided. Still other aspects, objects and advantages of the invention will be apparent to those skilled in the art upon reading this disclosure.

Figures 2 and 2A illustrate details of construction of the apparatus of Figure 1.

Figure 3 is a modification of the apparatus illustrated in Figure 1.

Figure 4 illustrates details of construction of the apparatus illustrated in Figure 3.

Figure 5 illustrates another modification of the apparatus shown in Figure 1.

Figure 7 illustrates a modification which can be applied to the apparatus shown in Figures 1, 3, and 5.

Figure 1:
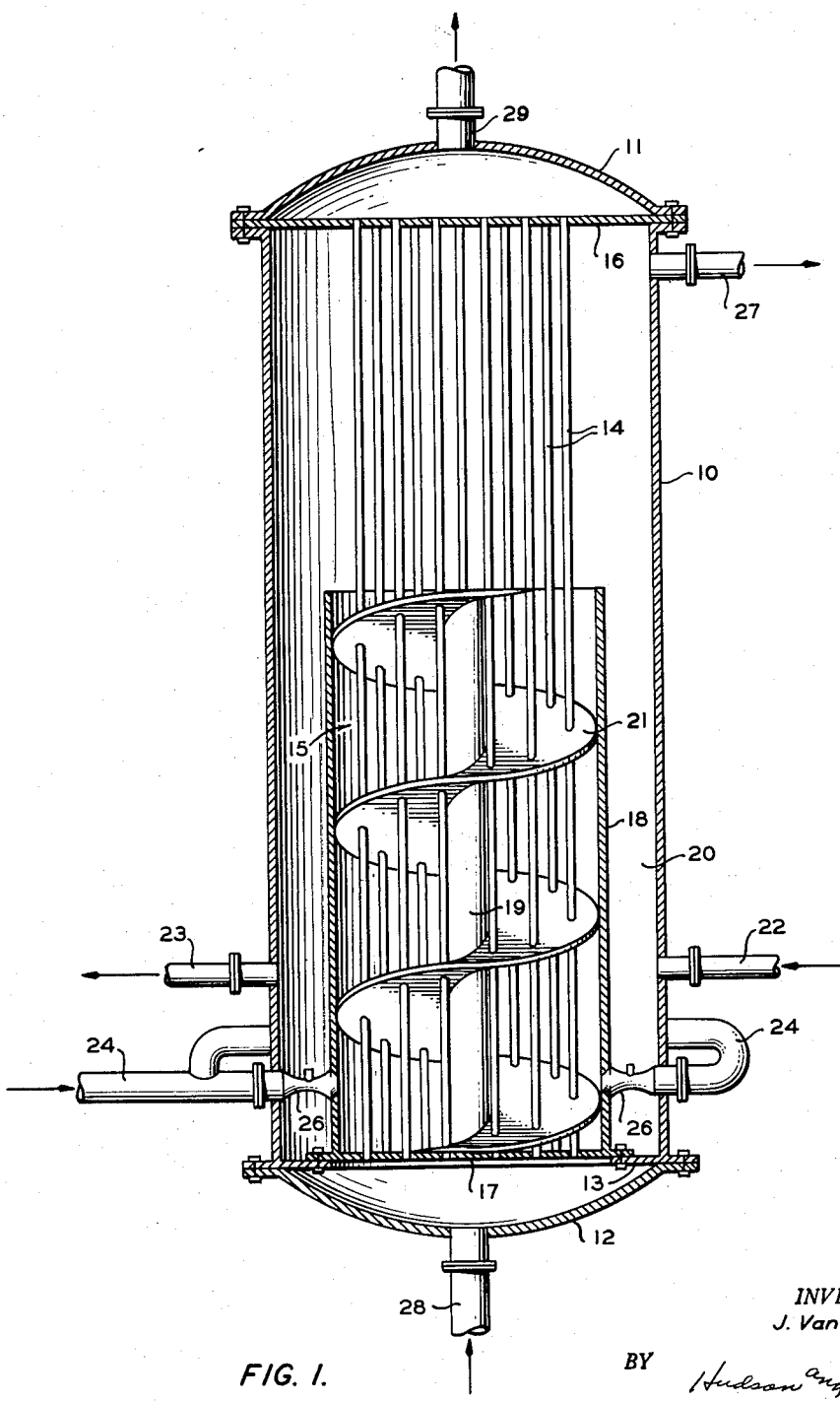
Figure 1 is an elevation, partly in section, of a contactor-settler according to the invention.

Referring now to the drawings, the invention will be more fully explained. Like reference numerals have been employed to denote like elements where possible. In Figure 1, there is illustrated a vertically disposed, substantially cylindrical, contactor-settler comprised of shell 10, upper closure member 11 and lower closure member 12. Annular support ring 13 is attached to the lower end of said shell 10. A heat exchanger comprising a plurality of heat exchange tubes 14, extending between an upper tube sheet 16 and a lower tube sheet 17, is vertically and coaxially disposed within said shell 10. Said lower tube sheet 17 rests on annular support ring 13 and is held in place by suitable bolts as shown. Suitable gasket material can be employed between tube sheet 17 and annular support ring 13. Upper tube sheet 16 rests on the upper flange of vessel 10 and together with upper closure member 11 is bolted to shell 10 as shown. Cylindrical partition 18 surrounds the lower portion of said heat exchange tubes 14 and rests upon lower tube sheet 17. Said cylindrical partition thus divides the interior of shell 10 into a lower central section 15 within said partition, and a lower annular section 20 without said partition and surrounding said central section 15. Spiral baffle means comprising a helical screw 19 is provided within said cylindrical partition. Said helical screw 19 comprises a substantially continuous helically disposed flange 21 extending radially outward from the axis of said screw. The outer edge of said flange 21 is contiguous with the inner wall of cylindrical partition 18, thus forming an upwardly spiraling path for liquids introduced into the lower portion of the central or contacting section. Heat exchange tubes 14 extend through flange 21 as shown. In the form of the apparatus here illustrated, the heat exchange means and helical screw 19 are constructed as an integral unit.

A first inlet conduit 22 extends into the lower portion of said annular section. A first outlet conduit 23 extends from the lower portion of said annular section 20. Inlet conduit 24 is provided with a plurality of eductors 26 and together, said inlet conduit 24 and eductors 26 comprise conduit inlet means extending from without said shell 10 and through said annular section 20 to the interior of cylindrical partition 18, i.e., said central section 15. Eductors 26 are provided with a tapered end which engages a corresponding tapered seat in openings provided in cylindrical partition 18. While two inlet conduits 24 and two eductors 26 have been shown it will be understood that one or more than two of said conduits and said eductors, suitably positioned around the vessel, can be employed. Further details regarding the construction and assembly of eductors 26 and inlet conduit 24 are given in connection with the description of Figures 2 and 2A hereinafter. As here shown, eductors 26 comprise a Venturi shaped eductor in open communication with liquid in said annular section and adapted to cause liquid from said annular section to be mixed with liquid being pumped through inlet conduit 24 and eductor 26 into said central section. A second outlet conduit 27 extends from the upper portion of shell 10. A third inlet conduit 28 extends to lower closure member 12 and a third outlet conduit 29 extends from upper closure member 11.

In Figure 2, there is illustrated one form of a conduit inlet means assembly which can be employed in the apparatus of Figure 1. Eductor 26 is flanged into conduit inlet 24 at one end, as shown. The other end of said eductor 26 extends into a sleeve 31 in cylindrical partition 18. The method of assembly of this apparatus will be readily apparent to those skilled in the art.

Figure 2A illustrates another form of conduit inlet means which can be employed in the apparatus of Figure 1. In this modification, eductor 26 is provided with a tapered end 32 which cooperatively engages a corresponding tapered seat in boss member 33 provided in cylindrical partition 18.

In Figure 3, inlet conduit 24' having eductor 26' disposed therein forms a conduit inlet means assembly extending from without shell 10, through said annular section 20, and into said central section 15. Outlet conduit 23' extends from said annular section 20 and is in communication with Venturi eductor 26 by means of T 34 as shown. Conduit 35, also in communication with T 34, is provided as another point for the introduction of fluid such as fresh catalyst in an alkylation process. Conduit 36 extends from T 37 in one of said conduit outlets 23' and is provided for removing fluid, such as spent catalyst to a catalyst regeneration unit, not shown.

Figure 4 illustrates details of the construction of that portion of conduit inlet 24' which actually extends through shell 10, annular section 20, and central partition 18 into central section 15. A sleeve member 38 is flanged into conduit inlet 24' as shown and as will be understood by those skilled in the art. Said sleeve member 38 is provided with a tapered end which cooperatively engages a tapered seat in cylindrical partition 18.

In the apparatus of Figure 5, the shell of the vessel is comprised of cone shaped adapter 40 and a cylindrical upper shell 41 of increased diameter. Said heat exchange tubes 14' are hair pin shaped and extend from one side of lower tube sheet 17 to the other side of said lower tube sheet. Lower closure member 12' is provided with a dividing member 42 which cooperates with recessed member 43 attached to said lower tube sheet and divides said lower closure member 12' into two portions. An inlet conduit 28' and an outlet conduit 28" extends to and from the said two portions of said lower closure member for the introduction and removal of cooling medium to said heat exchange tube 14'. The increased diameter of upper shell 41 provides a greater decrease in linear velocity of the reaction mixture and aids in separation.

In Figure 7, a plurality of eductors 26 connected to a plurality of conduit inlets 24, 24A, and 24B to form a plurality of conduit inlet means assemblies vertically positioned with respect to shell 10, are provided for the multiple injection of liquids into central section 15. For example, additional olefins can be introduced through conduits 24A and 24B in the alkylation of isobutane with olefins. By introducing the major portion of the isobutane, together with some olefin, through conduit 24, and then introducing additional olefin through 24A and 24B, the isobutane to olefin ratio throughout the reaction zone can be more precisely controlled. This modification of the apparatus can be applied to that shown in Figures 1, 3, and 5.

The contactor-settlers above described are of particular value to smaller refiners. This contactor-settler, together with a deisobutanizer, would provide the major equipment additions necessary to a catalytic polymerization unit to provide a complete alkylation unit. The contactor-settler of the invention eliminates piping and instrumentation between the conventional contactor and settler of the prior art and reduces maintenance. It is to be noted that the contactor-settler is constructed in a manner that it can be readily assembled or disassembled, if necessary. For example, referring to Figure 1, upper closure member 11 can be removed and the heat exchange bundle comprising the upper and lower tube sheets, tubes 14 and helix 19 can be readily lifted out of shell 10 by loosening the bolts holding lower tube sheet 17 to the annular support member 13.

In operation, for example in the alkylation of isobutane with butylenes or ethylene in the apparatus of Figure 1, the lower annular settling section 20 is first filled with liquid catalyst. A mixture of isoparaffin and olefin in the proper ratio is prepared and introduced through conduit inlet 24 and eductor 26 into the lower central contacting section 15 of the apparatus. Said hydrocarbon in flowing through eductor 26 causes catalyst to be drawn into said eductor, mixed with said hydrocarbons, and the mixture is introduced into said lower central section. Immediately upon entering said lower section, the mixture of hydrocarbons and catalyst comes into contact with heat exchange tubes 14 and the rapid local overheating referred to above is substantially avoided. The spiral motion imparted to the mixture by helical screw 19 aids in maintaining the emulsion in the contacting zone. Said spiral action also improves the heat transfer agency between said heat exchange tubes 14 and the mixture of hydrocarbons and acid. Upon reaching the top of said contacting section, the spiral motion imparted to the mixture causes the heavier of said liquids, i.e., the catalyst, to be thrown toward the exterior of the vessel and said catalyst travels downwardly into the lower annular settling section. A decrease in upward velocity resulting from the larger diameter of shell 10, as compared with the diameter of cylindrical partition 18, also aids in the separation of catalyst from the hydrocarbons. As the mixture travels upwardly in the upper settling section, cooling is continued and further settling is effected. Hydrocarbons are withdrawn through conduit outlet 27 and passed to conventional separation means for the separation of the alkylate produced from unreacted isobutane and other hydrocarbons which may be present. Makeup acid can be added through conduit inlet 22. During the operation a small stream of spent acid can be withdrawn from conduit outlet 23 and passed to an acid regenerator (not shown) if necessary or desirable. During the entire operation, of course, cooling water is introduced via conduit inlet 28, passed through heat exchange tubes 14 and withdrawn through conduit outlet 29.

The following examples will serve to further illustrate the invention.

*Example I*

A hydrocarbon stream comprising essentially a mixture of isobutane and mixed butylenes in a volume ratio of about 6:1 is introduced at a temperature of about 100° F. through conduit inlet 24 and eductor 26 of the apparatus shown in Figure 1 wherein it is mixed with anhydrous HF acid, also at a temperature of about 100° F. and having an acidity of about 90%, in a hydrocarbon to acid ratio of about 0.5:1 and introduced into the lower contacting section with immediate cooling. The maximum temperature reached in said lower contacting section is about 108° F. A hydrocarbon reaction effluent stream is withdrawn through conduit 27 and the alkylate produced is separated therefrom by conventional fractionation methods. The octane number of said alkylate is 104.2 (research method with 3 cc. TEL).

*Example II*

A stream of isobutane and a stream of mixed butylenes (of essentially the same composition as in Example I) are introduced at a temperature of about 100° F. into the lower portion of a conventional vertically disposed contactor vessel having a lower mixing section. The isobutane to butylene ratio is about 6:1 as in Example I. A stream of HF acid of essentially the same composition as employed in Example I is also introduced at a temperature of about 100° F. into said lower mixing section. Said reactants are mixed and travel upwardly through a contacting zone provided with heat exchange means similar to the heat exchange means provided in the contactor-settler of Figure 1 except that the heat exchange means of said conventional reactor does not extend completely to the bottom of the lower mixing section as in the contactor-settler of Figure 1. Consequently there is a short space and a short interval of time during which the reaction mixture is not cooled. The maximum temperature reached in said conventional contactor is about 119° F. After separation from the unreacted hydrocarbons by conventional fractionation methods, the alkylate produced (having essentially the same boiling range as the alkylate of Example I) has an octane number of 103.4 (research method with 3 cc. TEL).

Figure 6:
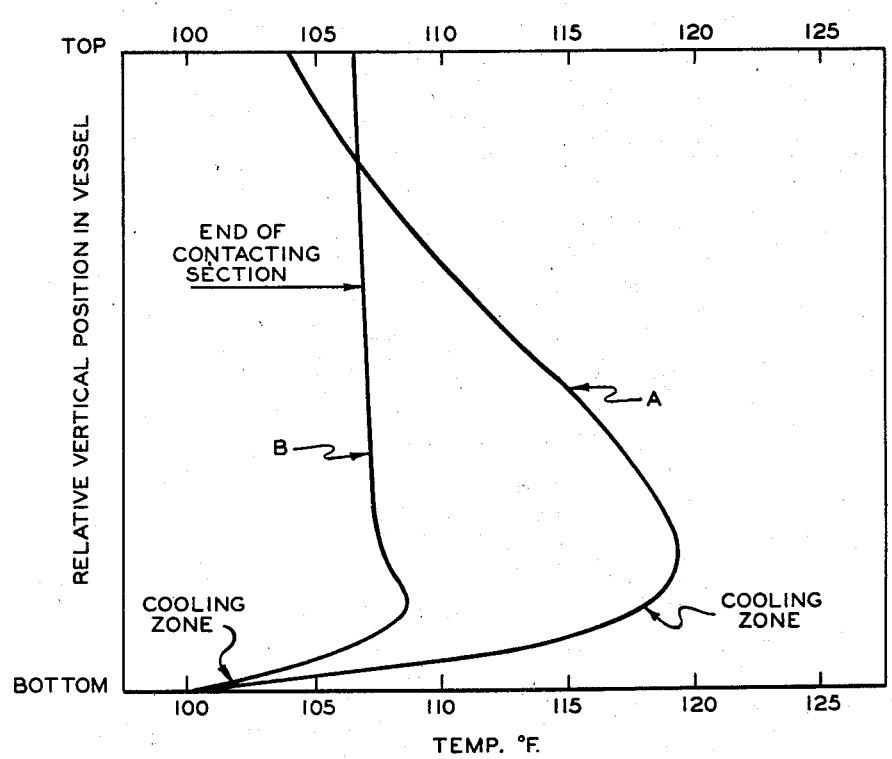
Figure 6 is a temperature gradient diagram illustrating a temperature gradient taken vertically through the contactor-settler of the invention compared with a temperature gradient taken vertically through a contactor of the prior art.

Figure 6 is a temperature gradient diagram through the contactor-settler of Example I and the contactor of Example II in a vertical direction. Curve A represents the temperatures attained by the reaction mixture at vertically disposed points in the conventional apparatus. Curve B represents the temperatures attained at corresponding points in the contactor-settler of the invention. It is apparent that by providing the immediate cooling as in the contactor-settler of the invention, the excessive local overheating of the conventional apparatus is avoided. A comparison of the octane numbers of Examples I and II shows the improved quality of the alkylate.

It is not believed necessary to give further details regarding the operation of the alkylation of isoparaffins with olefins. Such operating conditions are well known to those skilled in the art. Further details regarding such operating conditions can be found in the copending application of A. B. Leonard and G. R. Hettick, Serial No. 257,522, filed November 11, 1951, now U.S. Patent No. 2,764,623, and also in Patents 2,393,857, issued to F. E. Frey on January 29, 1946, and 2,410,498 issued to H. J. Hepp on November 5, 1946.

It is believed clear that the method of the invention is not limited to the alkylation of isoparaffins with olefins using HF acid. The invention can also be employed using other liquid catalysts such as aluminum chloride-hydrocarbon complex, sulfuric acid, etc. Likewise, the method of the invention can be employed in carrying out processes wherein immiscible liquids are contacted and/or reacted such as in polymerization and various sweetening operations. The apparatus of the invention can be employed in any process wherein immiscible liquids are contacted and then separated. For example, the apparatus can be used in copper sweetening, amine treating, caustic washing, etc. and in other liquid-liquid and in liquid-solids slurry operations.

While the invention has been described as employing the heat exchange means of the apparatus for cooling purposes said heat exchange means can be employed for heating purposes if desired.

Various other modifications of the invention will be apparent to those skilled in the art upon reading this disclosure. Such modifications are believed to be within the spirit and scope of the invention.

I claim:

1. A combined fluids mixing and separation apparatus which comprises, in combination: a substantially vertically disposed vessel; heat exchange means coaxially and longitudinally disposed within said vessel; a partition, open at its top, and surrounding the lower portion of said heat exchange means; and dividing the lower portion of said vessel into an annular outer section surrounding a central inner section, said inner and outer sections being in open communication above said partition; at least one inlet conduit means extending from without said vessel, through said outer section, and to said inner section; and an eductor-mixer in said inlet conduit means in communication with fluid in said outer section.

2. A combined fluids mixing and separation apparatus which comprises, in combination: a substantially cylindrical vertically disposed vessel; heat exchange means coaxially and longitudinally disposed within said vessel; a cylindrical partition open at its top and extending from the bottom portion of said vessel to a point intermediate said bottom portion and the top portion of said vessel, said partition surrounding the lower portion only of said heat exchange means and dividing the lower portion of said vessel into an outer annular section surrounding a central inner section; at least one inlet conduit means extending from without said vessel, through said outer section, and to said inner section; and an eductor-mixer in said inlet conduit means in communication with fluid in said outer section and adapted to withdraw said fluid from outer section and mix same with other fluid being introduced through said inlet conduit means.

3. Apparatus according to claim 2 wherein a plurality of said conduit inlet means extending from without said vessel, through said outer section, and to said inner section, are provided in vertically disposed position with respect to the lower portion of said vessel and each has an eductor-mixer disposed therein.

4. A combined fluids mixing and separating apparatus which comprises, in combination: a vertical substantially cylindrical shell; upper and lower closure members for said shell; a heat exchanger coaxially positioned within said shell and comprising a plurality of tubes extending between a pair of tube sheets; baffling means in the lower portion only of said heat exchanger, said tubes extending through said baffling means; a cylindrical partition open at its top and surrounding the lower portion only of said heat exchanger and dividing the interior of said shell into a central section and an annular section surrounding said central section; a first inlet conduit extending to the lower portion of said annular section; a first outlet conduit extending from the lower portion of said annular section; at least one inlet conduit means extending from without said shell, through said annular section and to said central section, the portion of said conduit means traversing said annular shell comprising an eductor-mixer adapted to cause liquid from said annular section to be withdrawn from said annular section and mixed with liquid being passed through said conduit means; a second outlet conduit extending from the upper portion of said shell; a third inlet conduit in said lower closure member; and a third outlet conduit extending from said upper closure member.

5. The apparatus of claim 4 wherein said baffling means comprises a helical screw coaxially disposed with respect to said heat exchanger and comprising a helical screw having a helically disposed flange extending radially outward from the axis of said screw to the inner wall of said cylindrical partition to form an upwardly spiraling path for liquids introduced into the lower portion of said central section, and where said heat exchanger tubes extend through said flange.

6. The apparatus of claim 5 wherein said eductor-mixer in said inlet conduit means is without said shell and said annular section but is in communication with said first outlet conduit.

7. Apparatus according to claim 4 wherein a plurality of said conduit inlet means extending from without said vessel, through said outer section, and to said inner section, are provided in vertically disposed position with respect to the lower portion of said vessel, and the portion of each of said conduit means traversing said annular section comprises an eductor-mixer.

8. Apparatus according to claim 4 wherein said inlet conduit means extending from without said shell, through said annular section and to said central section comprises: a first conduit having a flange on the end thereof; a second conduit having a flange on one end thereof, the other end thereof being attached to said shell at an opening provided in the lower portion of said shell; and an eductor-mixer having a flange on one end and a cylindrical end portion at the other end, said eductor-mixer being adapted to be inserted through said second conduit with said cylindrical end portion slidably engaging a sleeve provided in the lower portion of said partition and said flanged end engaged between said flanges on said first and said second conduits.

9. Apparatus according to claim 8 wherein said other end of said eductor-mixer is tapered and is adapted to engage a tapered seat in a boss member provided in the lower portion of said cylindrical partition.

10. A combined fluids mixing and separating apparatus which comprises, in combination: a vertical substantially cylindrical shell, said shell having a lower portion and an upper portion of larger diameter than said lower portion; upper and lower closure members for said shell, said lower closure member being divided into an inlet section and an outlet section; a heat exchanger coaxially and longitudinally positioned within said shell and comprising a plurality of hair pin shaped tubes extending from a tube sheet attached to supporting means at the lower end of said shell; baffling means in the lower portion only of said heat exchanger, said tubes extending through said baffling means; a cylindrical partition open at its top end and surrounding the lower portion only of said heat exchanger and dividing said lower portion of said shell into an outer annular section surrounding a central inner section; a first inlet conduit extending to the lower portion of said annular section; a first outlet conduit extending from the lower portion of said annular section; at least one inlet conduit means extending from without said shell, through said annular section, and to said inner section, the portion of said conduit means traversing said annular section comprising an eductor-mixer in communication with and adapted to cause liquid from said annular section to be mixed with other liquid being passed through said conduit means; a second outlet conduit extending from said upper closure member; a third inlet conduit extending to the inlet section of said lower closure member; and a third outlet conduit member extending from the outlet section of said lower closure member.

11. The apparatus of claim 10 wherein said baffling means comprises a helical screw coaxially disposed with respect to said heat exchanger and comprising a helical screw having a helically disposed flange extending radially outward from the axis of said screw to the inner wall of said cylindrical partition to form an upwardly spiraling path for liquids introduced into the lower portion of said central section, and where said heat exchanger tubes extend through said flange.

12. The apparatus of claim 11 wherein said eductor-mixer in said inlet conduit means is without said shell and said annular section but is in communication with said first outlet conduit.

13. A combined fluids mixing and separation apparatus which comprises, in combination: a substantially cylindrical vertically disposed vessel; heat exchange means coaxially and longitudinally disposed within said vessel; a cylindrical partition open at its top and extending from the bottom portion of said vessel to a point intermediate said bottom portion and the top portion of said vessel, said partition surrounding the lower portion only of said heat exchange means and dividing the lower portion of said vessel into an outer annular section surrounding a central inner section; and at least one inlet conduit means extending from without said vessel, through said outer section, and to said inner section, the portion of said conduit means traversing said annular section comprising an eductor-mixer adapted to cause liquid from said annular section to be withdrawn from said annular section and mixed with liquid being passed through said conduit means.

References Cited in the file of this patent

UNITED STATES PATENTS

| | | |
|---|---|---|
| 2,238,802 | Altshuler et al. | Apr. 15, 1941 |
| 2,381,256 | Callaway | Aug. 7, 1945 |
| 2,384,714 | Villiger | Sept. 11, 1945 |
| 2,435,028 | Bradley | Jan. 27, 1948 |
| 2,460,987 | Kanhofer | Feb. 8, 1949 |
| 2,491,618 | Luetzelschwab | Dec. 20, 1949 |
| 2,720,447 | Jones et al. | Oct. 11, 1955 |

FOREIGN PATENTS

| | | |
|---|---|---|
| 226,310 | Switzerland | July 1, 1943 |